US008387805B2

(12) United States Patent
Olivier

(10) Patent No.: US 8,387,805 B2
(45) **Date of Patent: *Mar. 5, 2013**

(54) PIPELINE PIG STORAGE RACK APPARATUS

(75) Inventor: Pierre L. Olivier, Houma, LA (US)

(73) Assignee: Integris Rentals, L.L.C., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,850

(22) Filed: Jul. 10, 2012

(65) Prior Publication Data

US 2013/0011236 A1 Jan. 10, 2013

Related U.S. Application Data

(63) Continuation of application No. 13/012,519, filed on Jan. 24, 2011, now Pat. No. 8,215,499, which is a continuation of application No. 11/466,272, filed on Aug. 22, 2006, now Pat. No. 7,874,435.

(60) Provisional (Continued)

(51) Int. Cl.

| | |
|---|---|
| ***E21B 19/14*** | (2006.01) |
| *A47F 1/04* | (2006.01) |
| *B65D 85/20* | (2006.01) |
| *B65D 85/68* | (2006.01) |
| *F16L 3/22* | (2006.01) |

(52) U.S. Cl. ...... 211/70.4; 211/60.1; 206/443; 206/319; 248/68.1

(58) Field of Classification Search .................. 211/189, 211/60.1, 70.4; 108/55.1, 55.3, 55.5; 206/319, 206/386, 443, 53, 391; 248/68.1, 70, 74.4, 248/69

See application file for complete search history.

(56) References Cited

U.S. PATENT DOCUMENTS

| | | | |
|---|---|---|---|
| 991,736 | A | 5/1911 | Minnick |
| 2,355,559 | A | 8/1944 | Renner |
| 2,417,741 | A | 3/1947 | Dillon |
| 2,783,960 | A | 3/1957 | Herz et al. |
| 3,157,424 | A | 11/1964 | Hall |
| 3,204,583 | A | 9/1965 | Nicholson |
| 3,855,945 | A | 12/1974 | Sebilleau et al. |
| 3,895,726 | A | 7/1975 | Rassieur |
| 4,535,586 | A | 8/1985 | Eberle |
| 4,566,819 | A | 1/1986 | Johnston |
| 4,907,314 | A | 3/1990 | Kershaw |
| 5,018,629 | A | 5/1991 | Lamar |
| 5,110,073 | A | 5/1992 | Schoenky |
| 5,150,493 | A | 9/1992 | Sivacoe |
| 5,196,161 | A | 3/1993 | Lewis |
| 5,265,302 | A | 11/1993 | Sivacoe |
| 5,385,049 | A | 1/1995 | Hunt et al. |

(Continued)

*Primary Examiner* — Jonathan Liu
*Assistant Examiner* — Devin Barnett
(74) *Attorney, Agent, or Firm* — Garvey, Smith, Nehrbass & North, L.L.C.; Seth M. Nehrbass; Charles C. Garvey, Jr.

(57) ABSTRACT

A pipeline pig support rack apparatus includes a frame having a plurality of supports mounted thereon, each extending upwardly from the frame. Each pipeline pig support includes clamps that are comprised of first and second u-shaped members that are attached with a hinge. A bolted connection opposite the hinge is provided for holding the u-shaped members together in a closed position when securing a pipeline pig. Lifting eyes on the frame are provided for enabling the frame, its pig supports and any contained pipeline pigs to be lifted as a unit. A basket receptacle optionally is provided that receives the frame. The frame and basket receptacle are each independently liftable. The basket receptacle prevents spillage of hazardous materials that might be residing upon the pigs after they have been used to clean a particular pipeline.

17 Claims, 14 Drawing Sheets

Related U.S. Application Data application No. 60/710,562, filed on Aug. 23, 2005, provisional application No. 60/762,346, filed on Jan. 26, 2006, provisional application No. 60/806,415, filed on Jun. 30, 2006.

U.S. PATENT DOCUMENTS

| | | | |
|---|---|---|---|
| 5,522,633 | A | 6/1996 | Massi |
| 5,704,476 | A | 1/1998 | Abbott |
| 5,903,945 | A | 5/1999 | Lundie |
| 5,924,158 | A | 7/1999 | Watts |
| 6,475,294 | B2 | 11/2002 | McCanna et al. |
| 6,500,271 | B1 | 12/2002 | Moore et al. |
| 6,679,129 | B2 | 1/2004 | Savard |
| 6,792,641 | B1 | 9/2004 | Laker |
| 6,892,990 | B2 | 5/2005 | Pisczak |
| 6,962,476 | B2 | 11/2005 | Trpkovski |
| 7,059,819 | B2 | 6/2006 | Brackmann et al. |
| D553,971 | S | 10/2007 | Krueger |
| 7,464,966 | B2 | 12/2008 | Miyajima et al. |
| 7,654,390 | B2 | 2/2010 | Baechle et al. |
| 7,874,435 | B2 | 1/2011 | Olivier |
| 2001/0045503 | A1 | 11/2001 | Priuli |
| 2003/0160468 | A1 | 8/2003 | Segura |
| 2006/0013666 | A1 | 1/2006 | Halliar |

PIPELINE PIG STORAGE RACK APPARATUS

CROSS-REFERENCE TO RELATED APPLICATIONS

This is a continuation of U.S. patent application Ser. No. 13/012,519, filed on 24 Jan. 2011 (now U.S. Pat. No. 8,215, 499, which issued on 10 Jul. 2012), which is a continuation of U.S. patent application Ser. No. 11/466,272, filed 22 Aug. 2006 (now U.S. Pat. No. 7,874,435, which issued on 25 Jan. 2011), which is a non-provisional of U.S. Provisional Patent Application Ser. Nos. 60/710,562, filed 23 Aug. 2005; 60/762,346, filed 26 Jan. 2006; and 60/806,415, filed 30 Jun. 2006, all of which are hereby incorporated herein by reference.

Priority of all my prior applications, including U.S. patent application Ser. No. 13/012,519, filed on 24 Jan. 2011; U.S. patent application Ser. No. 11/466,272, filed 22 Aug. 2006; and U.S. Provisional Patent Application Ser. Nos. 60/710, 562, filed 23 Aug. 2005; 60/762,346, filed 26 Jan. 2006; and 60/806,415, filed 30 Jun. 2006, all incorporated herein by reference, is hereby claimed.

International Patent Application No. PCT/US06/32923, filed on 23 Aug. 2006, is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to pipeline cleaning devices known in the art as "pipeline pigs" as well as the use and storage of such devices. More particularly, the present invention relates to a pipeline pig storage rack and basket apparatus that enables the transport of multiple pipeline pigs to and from cargo boxes while minimizing damage to the pigs.

2. General Background of the Invention

A pipeline pig is an in-line scraper that can be a brush, blade, cutter or swab that is forced through pipelines by fluid pressure. Pigs are used to remove scale, sand, water and other foreign matter from the interior surfaces of a pipeline.

All baskets with solid design of which the present inventor is aware have flame-cut or drilled holes to release water, with the intent to be not used as a liquid holding tank.

Several patents have issued that relate generally to pipeline pigs. Examples of possibly relevant patents are contained in the following Table 1, each patent of the table being hereby incorporated herein by reference.

TABLE 1

| U.S. PAT. NO. | TITLE |
|---|---|
| 6,792,641 | Pipeline Pig |
| 6,679,129 | Pig for Detecting an Obstruction in a Pipeline |
| 6,500,271 | Pipeline Pig |
| 5,924,158 | Pipeline Pig |
| 5,903,945 | Pipeline Pig |
| 5,385,049 | Pipeline Pig and Method of Pipeline Inspection |
| 5,265,302 | Pipeline Pig |

TABLE 1-continued

| U.S. PAT. NO. | TITLE |
|---|---|
| 5,150,493 | Pipeline Pig |
| 4,907,314 | Pipeline Pig |

BRIEF SUMMARY OF THE INVENTION

The present invention provides a pipeline pig rack apparatus that includes a frame that can be comprised of a longitudinal member and a plurality of transverse members. A plurality of pig supports are mounted on the frame and extend upwardly therefrom. In the preferred embodiment, two pig supports are used to hold a single pipeline pig.

Each pig support includes a clamp that is comprised of first and second generally u-shaped members. One u-shaped member attaches to the other with a hinge. One of the u-shaped members can be mounted upon a structural member such as a post that extends upwardly from the frame.

The clamp can be secured in a closed position with a connection opposite the hinge. This connection can be a bolted arrangement secured with a cable so that none of the parts can be inadvertently dropped.

The frame optionally fits inside of a walled container or basket that prevents spillage of pollutants that might be coating a pig or pigs after use.

The device of the present invention is for moving multiple pipeline pigs safely to and from cargo boxes while minimizing damage to the pigs from one location to another and/or from manufacturer to pipeline.

Clamp inserts can optionally be provided to allow the clamps to hold pigs of various diameters.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
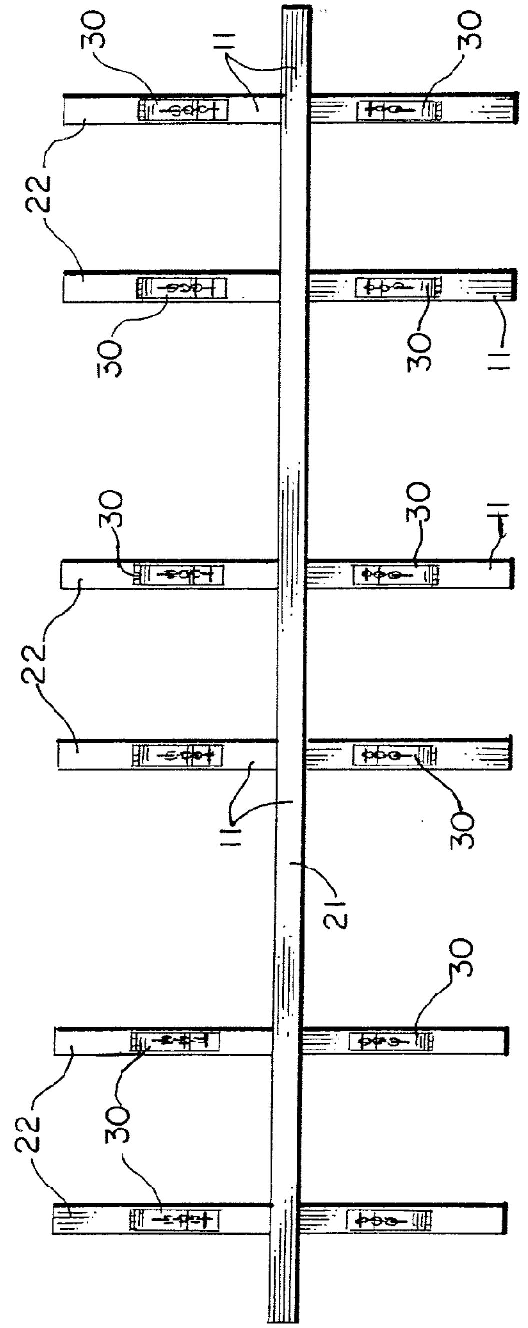
FIG. 1 is a plan view of a preferred embodiment of the apparatus of the present invention.
Figure 2:
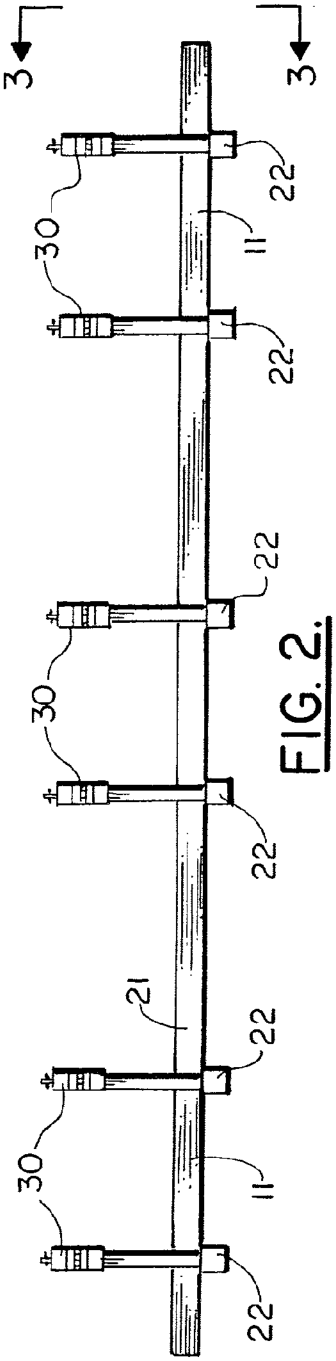
FIG. 2 is a front elevation view of a preferred embodiment of the apparatus of the present invention.

FIGS. 1-10 show generally a preferred embodiment of the apparatus of the present invention designated generally by the numeral 10. Pipeline pig rack apparatus 10 provides a frame 11 that fits into a basket receptacle 12. During use, the frame 11 supports a plurality of pipeline pigs 13. The basket receptacle 12 and frame 11 can be transported to and from selected locations. Pipeline pig apparatus 10 can be made of carbon steel, aluminum, or stainless steel, for example.

Figure 5:
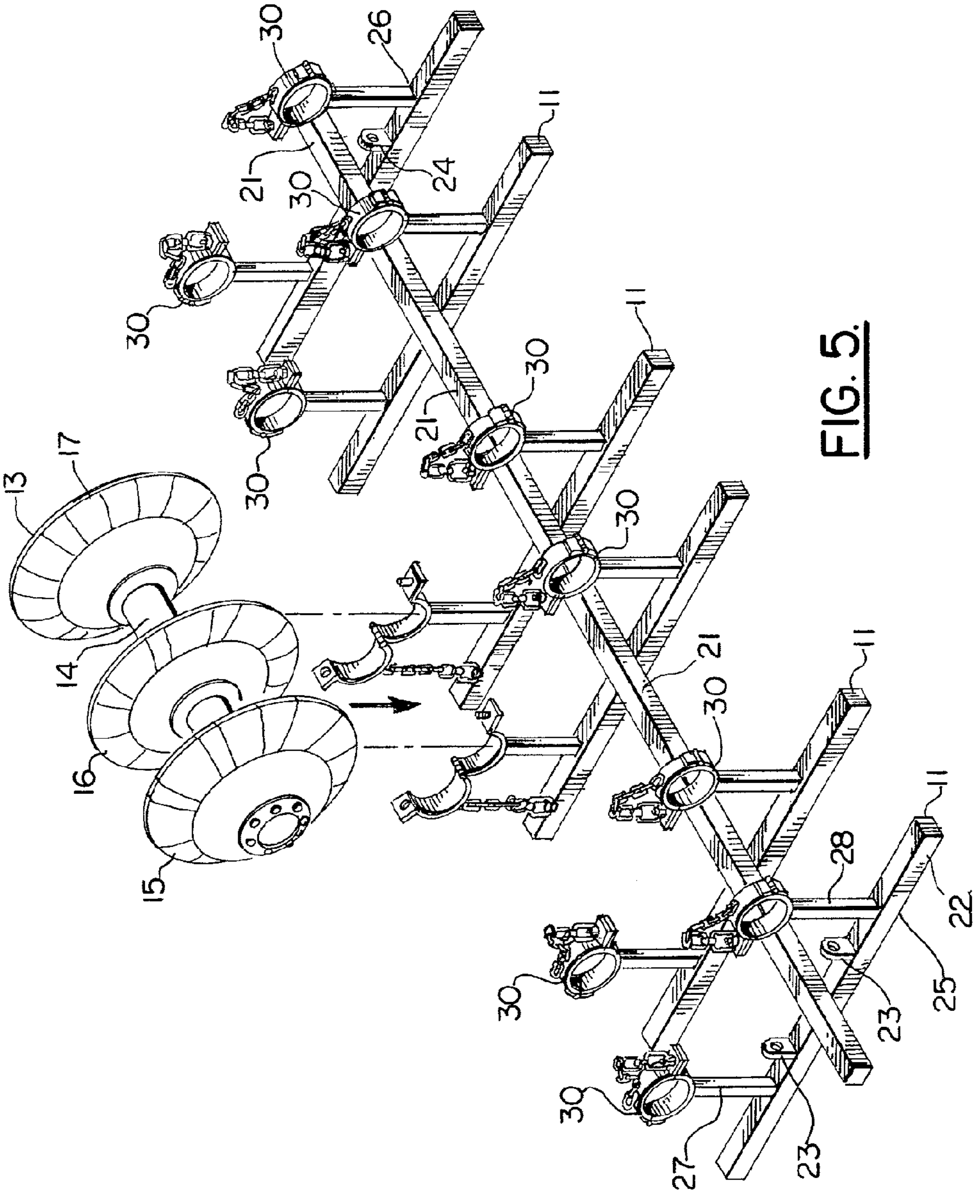
FIG. 5 is a perspective view of a preferred embodiment of the apparatus of the present invention.

Because the pipeline pigs 13 are used to swab and clean pipelines, they are typically coated with the material that previously flowed in the pipeline to be cleaned. Thus, the pipeline pigs 13 can in many instances be covered with a pollutant, hazardous material, volatile chemical, oil or the like. By using the apparatus 10 of the present invention, pigs 13 can be safely and securely transported. Contamination of the environment is protected by the basket receptacle 12 which envelops the frame 11 and any of the pipeline pigs 13 stored thereon. In FIG. 5, there is a schematic view of a pipeline pig 13 that has a shaft 14 and a plurality of discs 15, 16, 17. However, it should be understood that pipeline pigs 13 are well known in the art and are commercially available.

Figure 8:
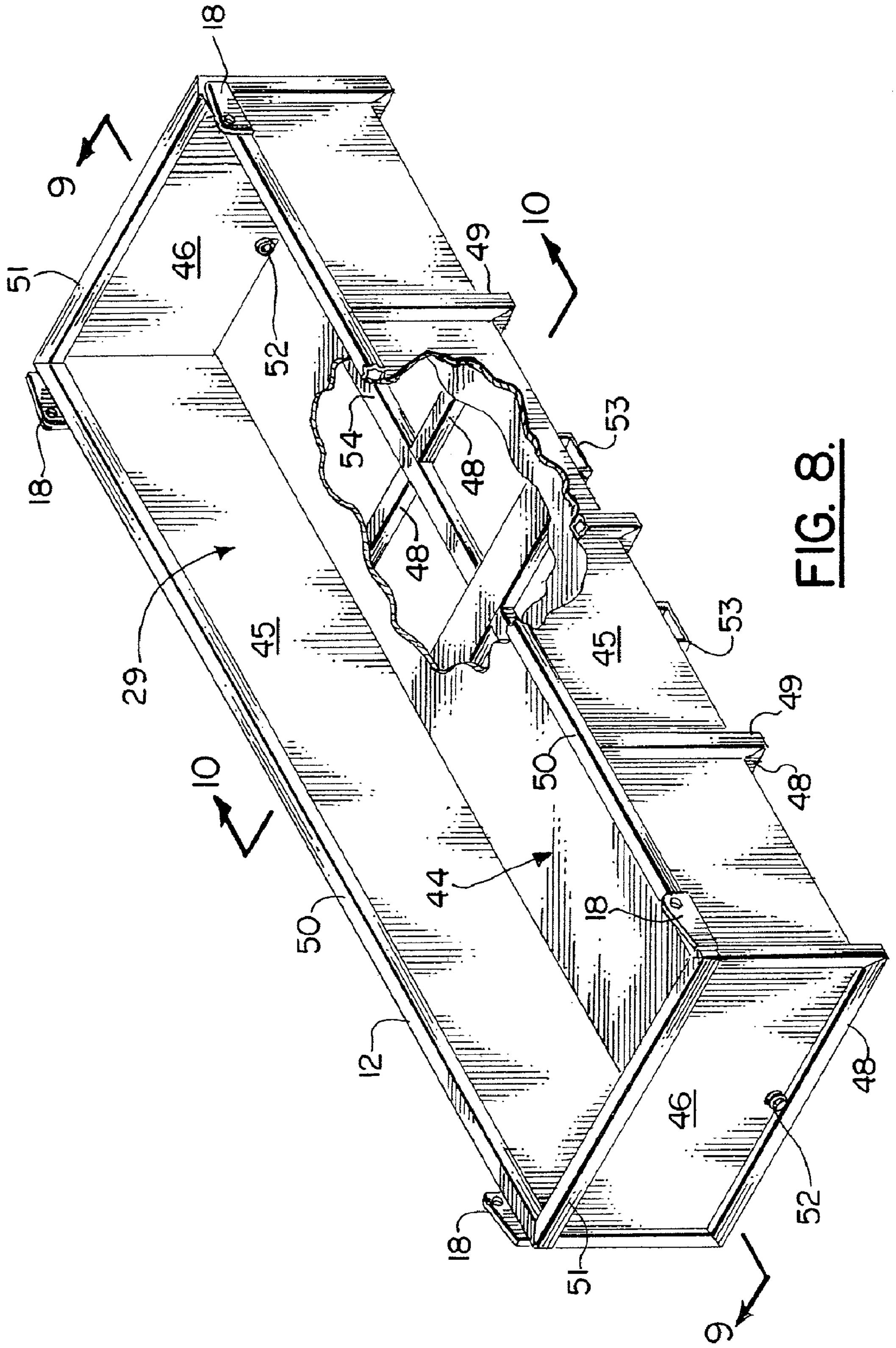
FIG. 8 is a partial perspective view of a preferred embodiment of the apparatus of the present invention.
Figure 9:
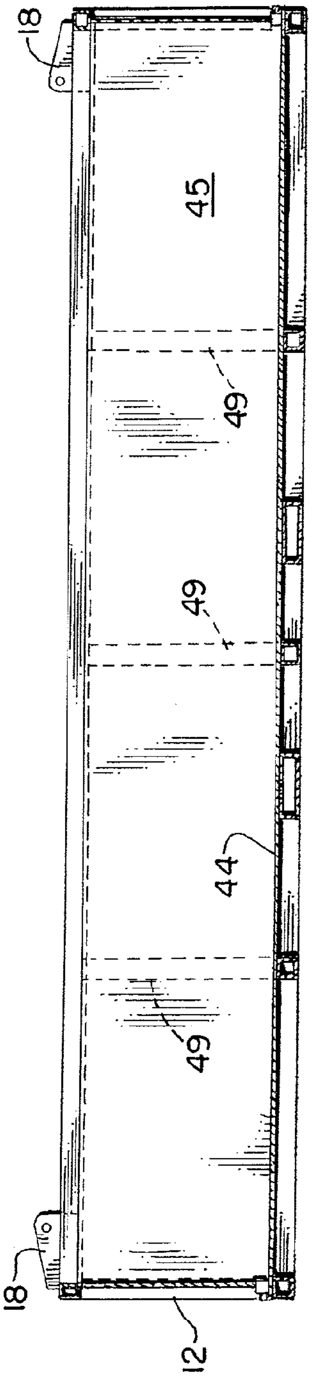
FIG. 9 is a sectional view taken along lines 9-9 of FIG. 8.
Figure 10:
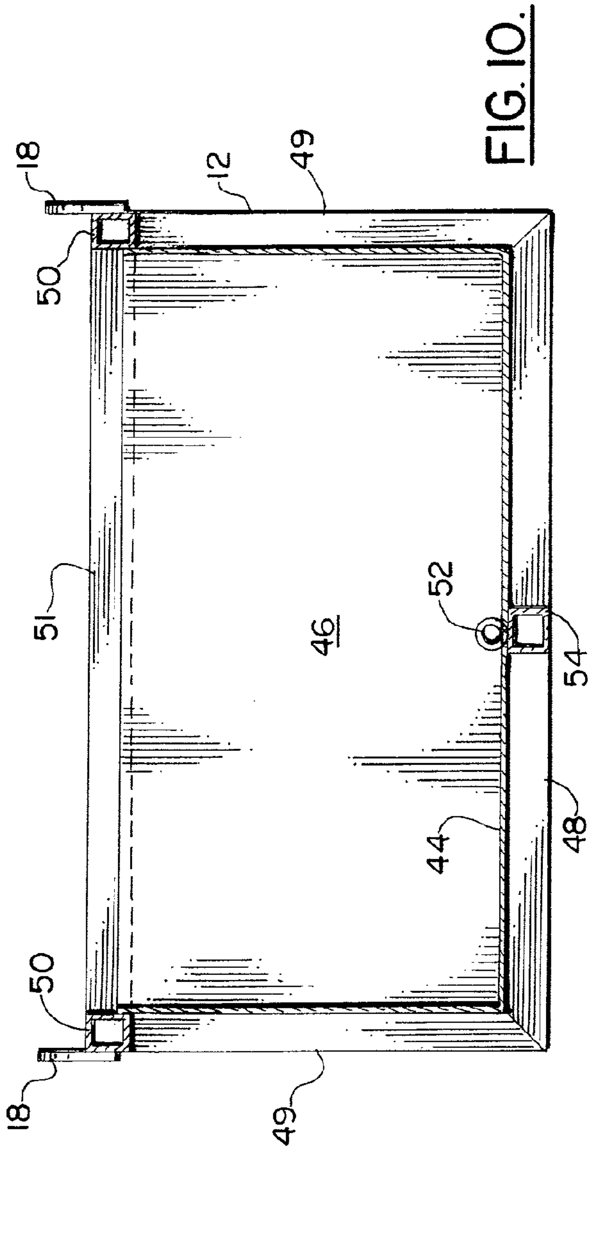
FIG. 10 is a sectional view taken along lines 10-10 of FIG. 8.

In the preferred embodiment, both the frame 11 and the basket receptacle 12 can be lifted using a lifting device such as a crane and rigging such as slings 120, 20, respectively and shackles 119, 19, respectively. The basket receptacle 12 thus provides lifting eyes 18, preferably at its corners. The basket receptacle can provide an interior 29 surrounding a bottom wall 44, side walls 45, and end walls 46. Basket receptacle 12 provides an open top that enables frame 11 and any supported pipeline pigs 13 to be lowered into the interior 29 of basket receptacle 12 as indicated schematically by arrows 47 in FIG. 6. The walls 44, 45, 46 are reinforced with beams 48, 49, 50, 51 and 54 that can be welded thereto. Transverse beams 48 and longitudinal beam 54 extend under bottom wall 44. In FIGS. 8-10 each end of a transverse beam 48 connects (e.g. by welding) to a vertical beam 49 and to longitudinal beam 54. Each vertical beam 49 connects (e.g. by welding) to a peripheral or perimeter beam 50 that extends along side wall 45. End peripheral or perimeter beams 51 each connect (e.g. by welding) to a side peripheral or perimeter beam 50. Drain openings 52 can be provided at each end wall 46, near bottom wall 44 for draining interior 29 of any spillage. Plugs can be used to close drain openings 52. The plugs can be made of carbon steel, aluminum, or stainless steel, for example. Tubing sections 53 can optionally provide fork lift sockets for enabling basket 12 to be lifted and moved with a fork lift.

Basket receptacle 12 is preferably solid throughout—sides, bottom, and ends. The ends can have, e.g., 2" (5.08 cm) field drains to release rainwater or fluids. Basket receptacle 12 can be made of carbon steel, aluminum, or stainless steel, for example. Basket receptacle 12 can have 2" (5.08 cm) plugs with 2" (5.08 cm) collars to connect a 90 degree elbow or nipple for the purpose of configuring or making up a 2" (5.08 cm) valve to allow fluid flow in or out. Basket receptacle 12 can trap contaminants (such as but not limited to any E.P.A. sensitive contaminants), preventing them from escaping due to rain or other sources of water, liquids, etc. This capacity gives the user more freedom for shipping while reducing the chances of spillage or other incident. Basket receptacle 12 can serve as a temporary holding unit (to help minimize the amount of fluids shared with the environment or site) when 2" (5.08 cm) plugs are used or otherwise the drain openings 52 are closed to prevent liquid from flowing therethrough. Drain openings 52 can be placed on the ends of basket 12 and on opposing corners. Basket 12 could serve as a vat, open top tank, or cargo basket. Basket 12 is preferably also stackable, saving space on site.

Figure 6:
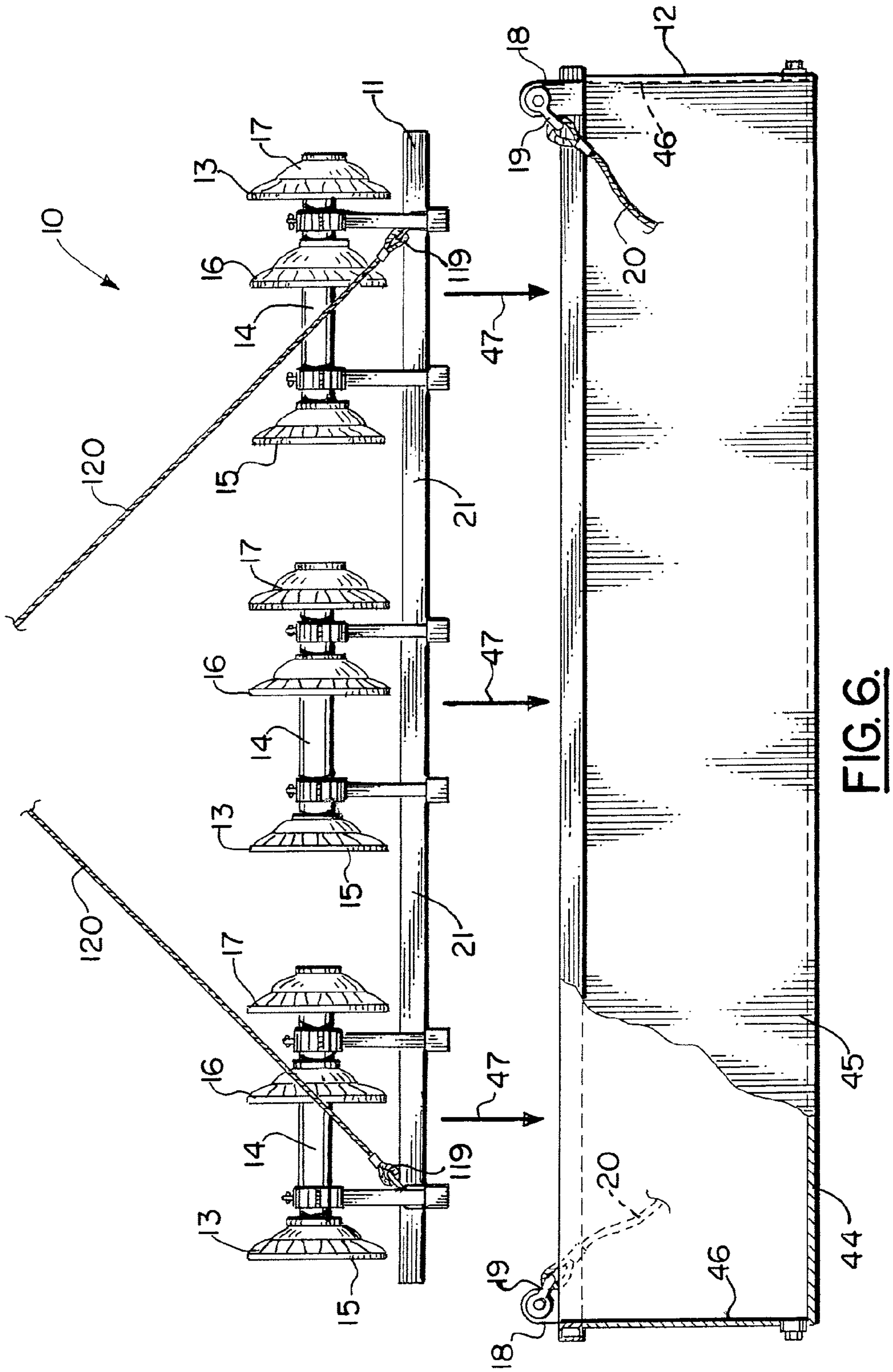
FIG. 6 is a partial sectional elevation view of a preferred embodiment of the apparatus of the present invention.
Figure 7:
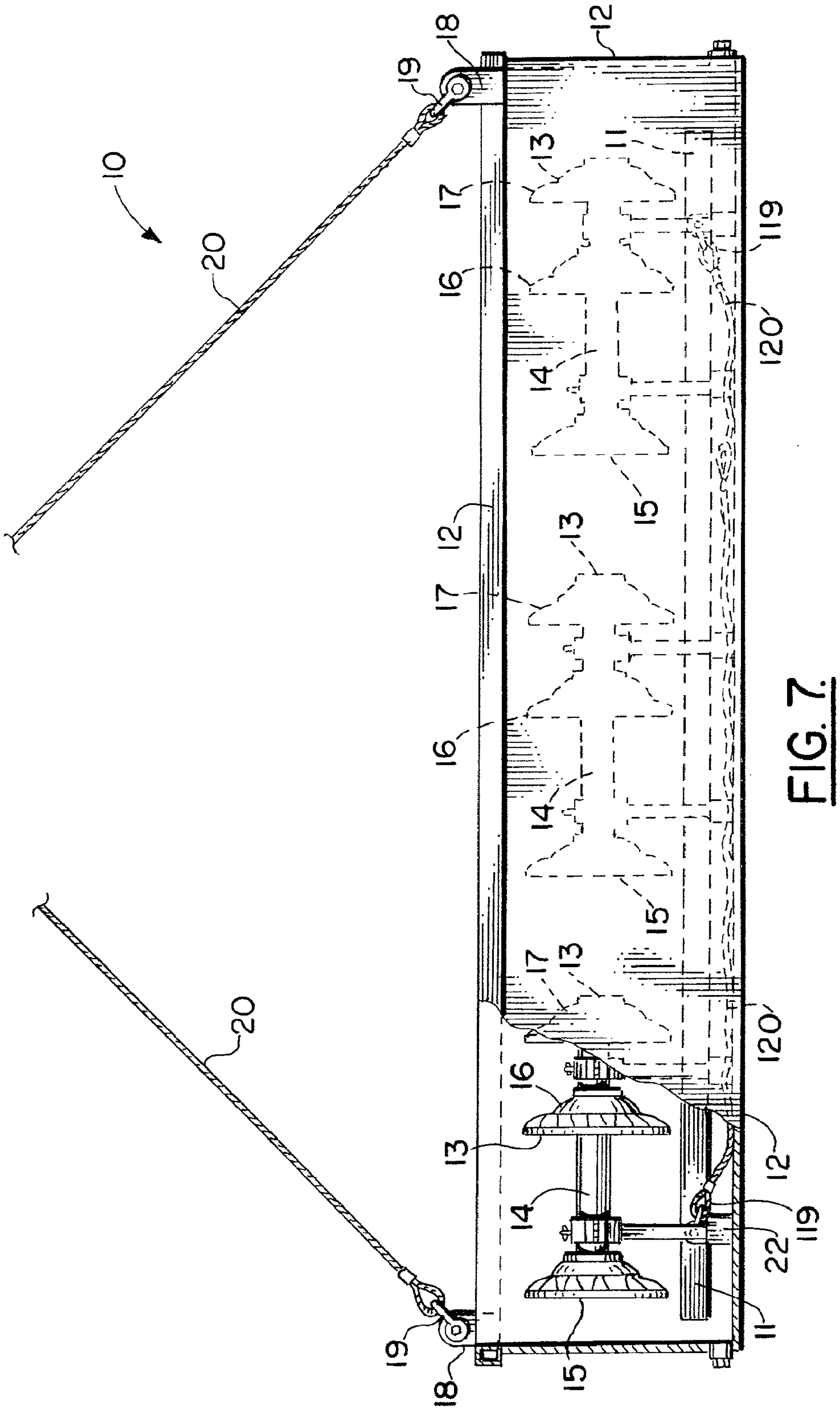
FIG. 7 is a partial sectional elevation view of the present invention.

A stored position of frame 11 and the contained pipeline pigs 13 within basket receptacle 12 is shown in FIG. 7. In FIG. 6, slings 120 are used to lower frame 11 (see arrow 47) into basket receptacle 12. In FIG. 7, slings 20 are used to lift the basket receptacle 12 and the contained frame 11 with pigs 13.

FIGS. 1, 2, 3, 4 and 5 show frame 11 more particularly. Frame 11 can include a longitudinal beam 21 to which are attached (for example, welded) a plurality of transverse beams 22. In the preferred embodiment, the transverse beams 22 are parallel to one another. Each of the transverse beams 22 forms an angle of about 90 degrees with the longitudinal beam 21. Lifting eyes 23, 24 are provided for attachment of shackle 119 and sling 120 at a location convenient for stable movement of frame 11, e.g. at opposing end portions of frame 11 as shown in FIG. 5. The frame 11 has end portions 25, 26. Lifting eyes 23 are provided on transverse beam 22 at end portion 25. Similarly, lifting eyes 24 are provided on a transverse beam 22 at end portion 26 of frame 11.

A plurality of vertical posts 27, 28 are attached to frame 11, preferably being mounted upon transverse beams 22 as shown in FIG. 5. Each transverse beam 22 provides a pair of posts 27, 28, one on each side of longitudinal beam 21. A clamp 30 is mounted to the upper end portion of each post 27 or 28 as shown in FIGS. 1-5.

Each clamp provides a u-shaped member 31 attached to a post 27 or 28 with a connection such as a welded connection 32. Hinge 34 is used to connect a second u-shaped member 33 to the first u-shaped member 31. Each of the u-shaped members provides a flange, the flanges 35, 36 abutting one another when the clamp 30 is in the closed position of FIG. 3. U-shaped member 31 has flange 35. U-shaped member 33 has flange 36 and an opening receptive of bolt 40.

Figure 3:
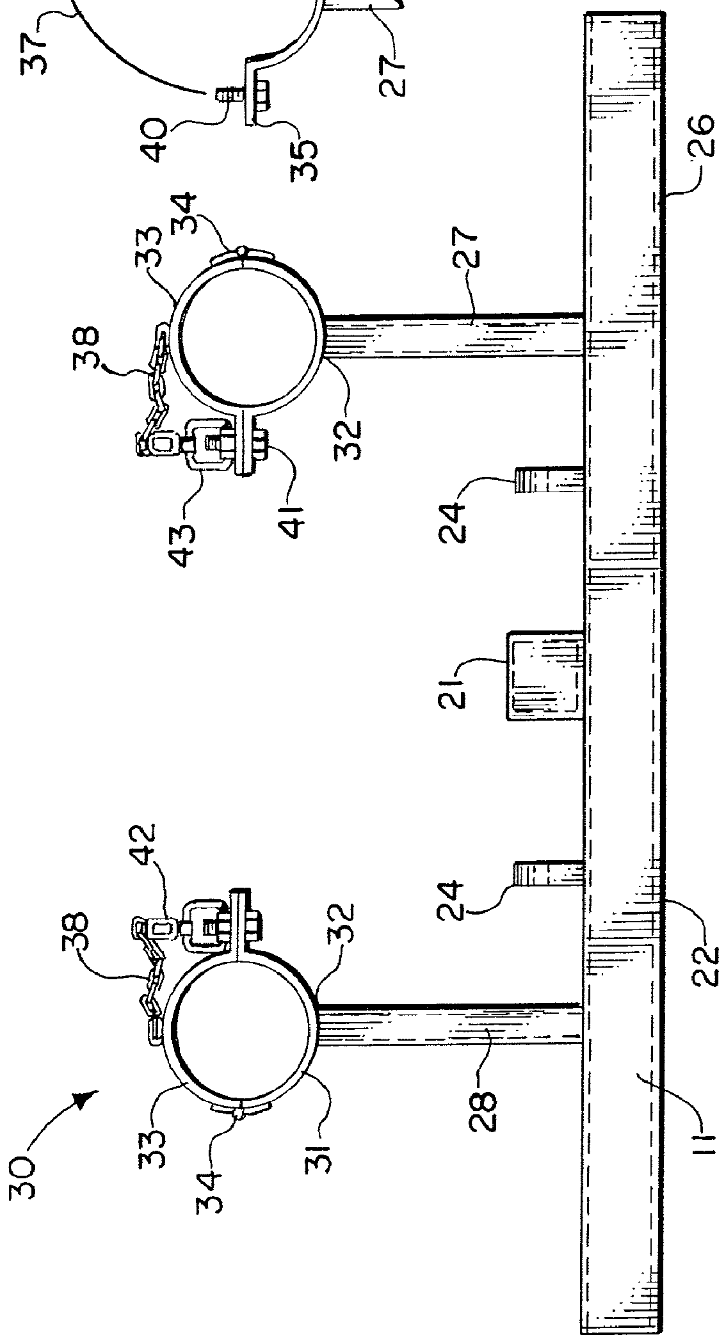
FIG. 3 is a sectional view of a preferred embodiment of the apparatus of the present invention, taken along lines 3-3 of FIG. 2.

A bolted connection can be used to secure the u-shaped members 31, 33 in the closed position of FIG. 3. When the bolted connection is released, arrow 37 indicates schematically an opening of the u-shaped members 31, 33 with respect to one another, the upper u-shaped member 33 rotating about hinge 34 with respect to the lower u-shaped member 31.

Figure 4:
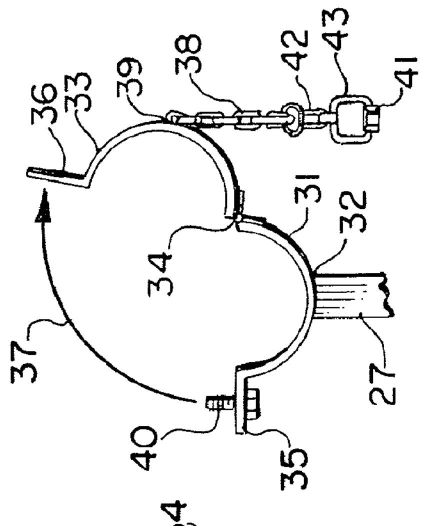
FIG. 4 is a fragmentary view of a preferred embodiment of the apparatus of the present invention.

The bolted connection can include bolt 40 and nut 41. Nut 41 is attached to ring 43. Ring 43 attaches to chain 38 using a swivel 42 as shown in FIG. 4. Swivel 42, chain 38 and ring 43 ensure that bolt 41 will not be dropped after the bolted connection is disconnected as shown in FIG. 4. The chain 38 and its attached swivel 42, ring 43 and nut 41 can be attached to upper u-shaped member 33 using a connection at 39 such as a welded connection. Swivel 42 allows rotation of ring 43 and nut 41 relative to chain 38 when it is desired to close upper u-shaped member 33 relative to lower u-shaped member 31, the position shown in FIG. 3.

The arrangement shown in FIG. 5 shows that a pair of clamps 30 could be used to support a single pipeline pig 13. The stored position is shown in FIG. 7.

Basket receptacle 12 can have dimensions of 7-35 feet (2.13-10.67 m) long by 4-8 feet (1.22-2.44 m) wide by 2.5-6 feet (0.76-1.83 m) high, for example (some commercial embodiments are 20' (6.10 m) long by 6' (1.83 m) wide by 38" (0.97 m) high). Racks 10 can have dimensions of 6-34 feet (1.83-10.36 m) long by 3.5-7.5 feet (1.07-2.29 m) wide by 1.5-5.5 feet (0.46-1.68 m) high, for example. Racks 10 can be manufactured to hold any pipeline pigs 13, for example pipeline pigs have diameters of 2-48 inches (5.08 cm-1.22 m).

Figure 11:
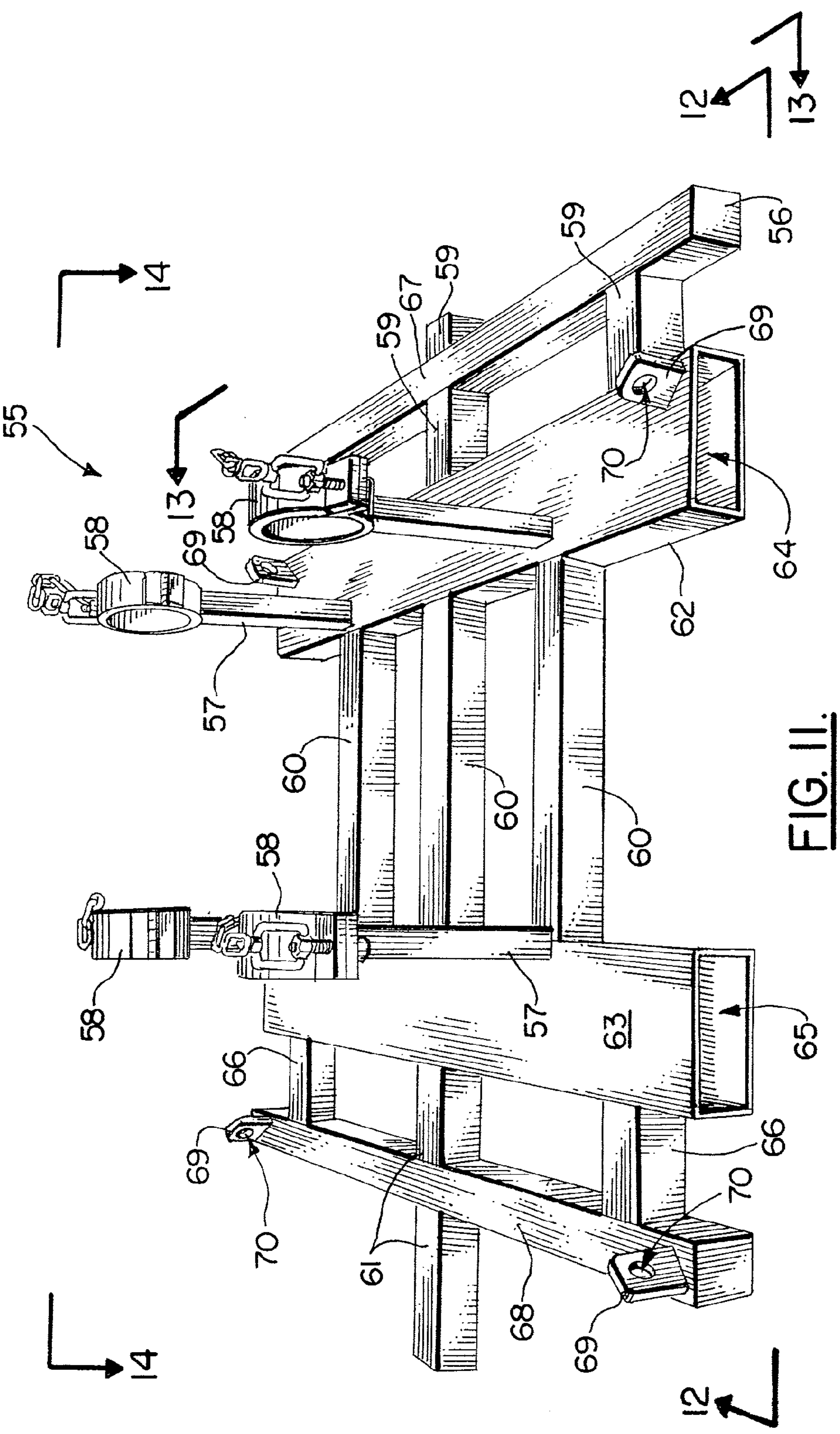
FIG. 11 is a perspective view of an alternate embodiment of the apparatus of the present invention.
Figure 12:
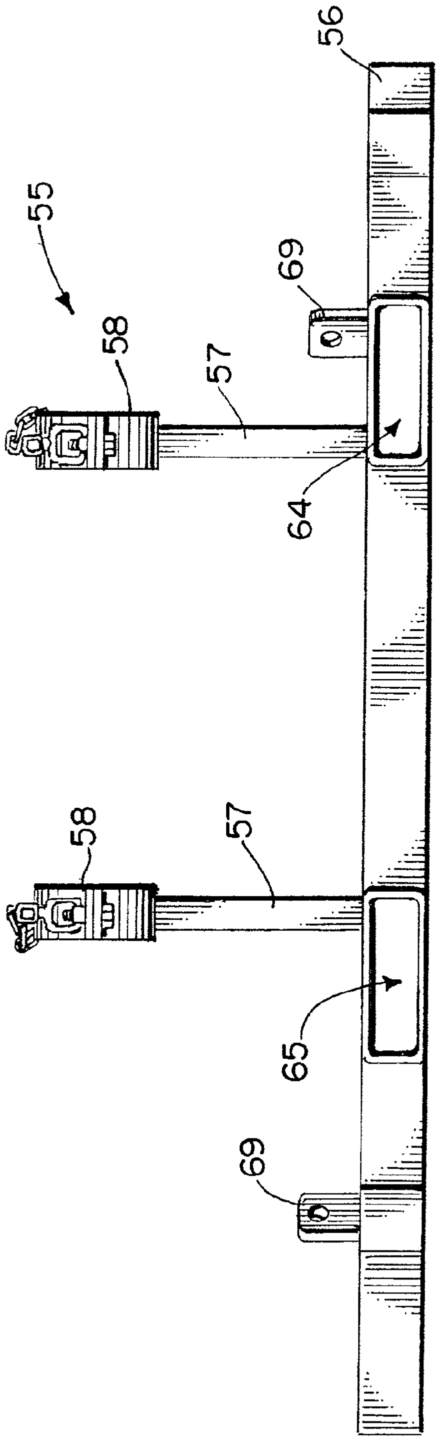
FIG. 12 is a side, elevation view of an alternate embodiment of the apparatus of the present invention taken along lines 12-12 of FIG. 11.
Figure 13:
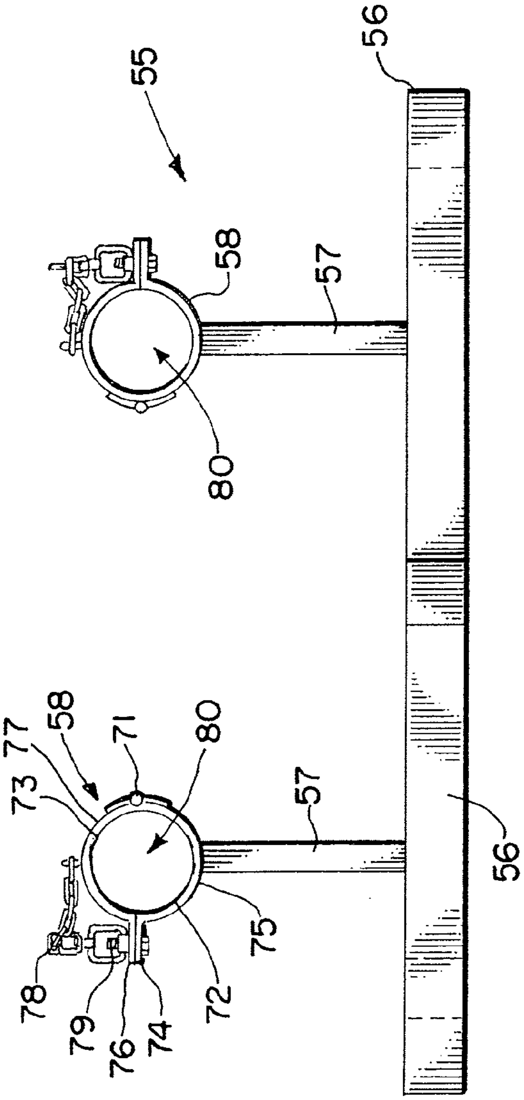
FIG. 13 is an end view of an alternate embodiment of the apparatus of the present invention, taken along lines 13-13 of FIG. 11.
Figure 14:
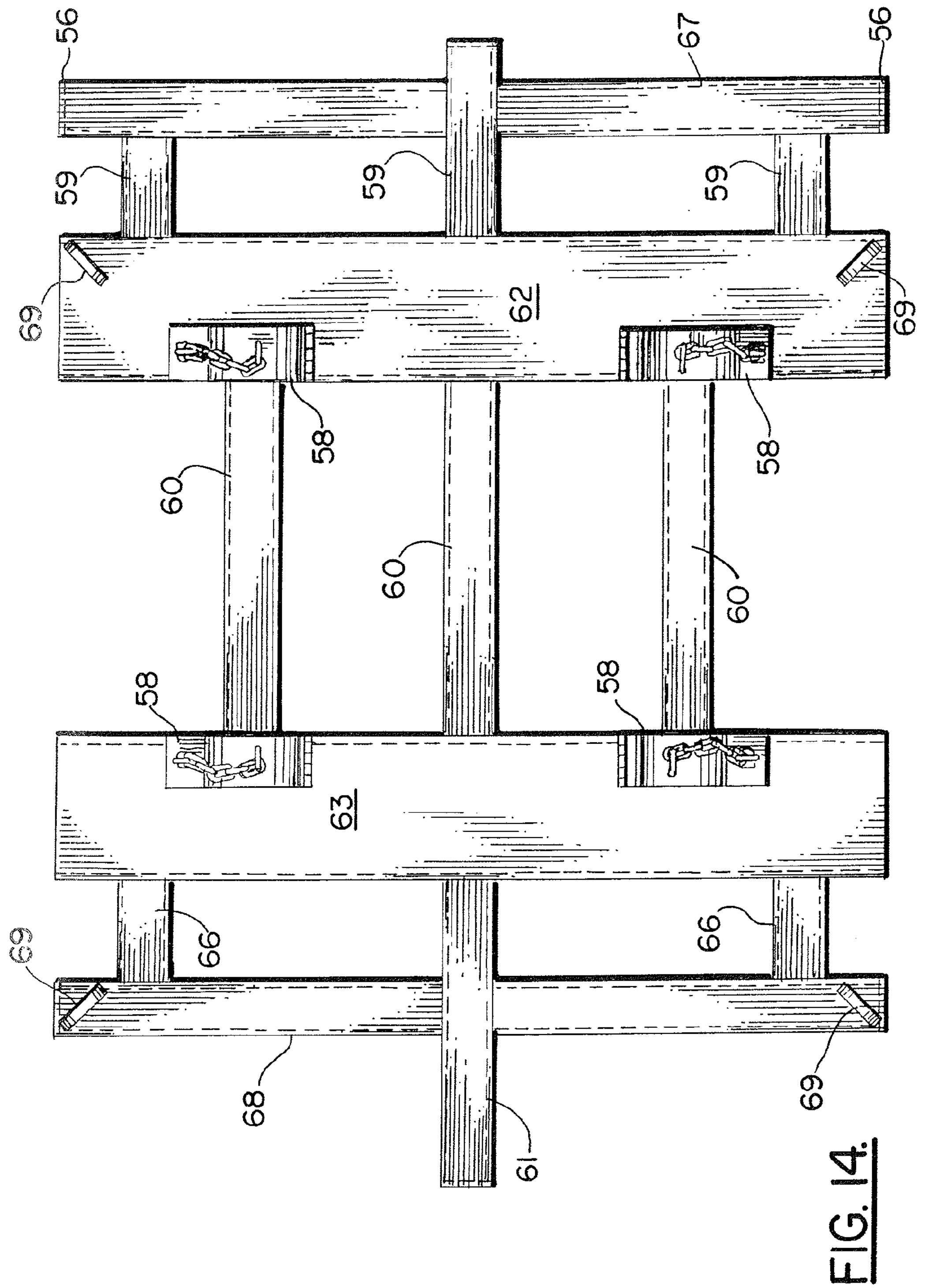
FIG. 14 is a top, plan view of an alternate embodiment of the apparatus of the present invention, taken along lines 14-14 of FIG. 11.

FIGS. 11-20 show alternate embodiments of the apparatus of the present invention. A first alternate embodiment is designated generally by the numeral 55 in FIG. 11. Pipeline pig rack apparatus 55 provides a base 56 that supports a plurality of vertically extending posts 57. Each post 57 supports a clamp 58. The clamps 58 are provided in pairs, each pair holding a pipeline pig 13 (see FIG. 15). The base 56 is comprised of a plurality of longitudinal beams and a plurality of transverse beams. These beams include longitudinally extending beams 59, 60, 61, 66 and transversely extending beams 62, 63, 67, 68. Two of the transverse beams 62, 63 provide sockets that enable the base 56 to be engaged with the forklift tines of a standard forklift truck (not shown). The transverse beam 62 thus provides socket 64. The transverse beam 63 provides socket 65. Longitudinal beams 59, 60 are connected to transverse beam 62. Similarly, longitudinal beams 60, 61, 66 are connected to transverse beam 63. As shown in FIG. 11, longitudinal beam 60 connects transverse beam 62 to transverse beam 63. Transverse beam 67 connects to beams 59 and is generally parallel to beam 62 as shown in FIGS. 11-14. Similarly, transverse beam 68 is parallel to transverse beam 63 and is connected thereto with beams 61, 66.

The beam 68 can be fitted with a pair of padeyes 69, each having an opening 70 for receiving a shackle or other element of rigging. The transverse beam 62 provides a pair of padeyes 69, each having an opening 70. Base 56 can be of a welded structural steel construction.

Figure 15:
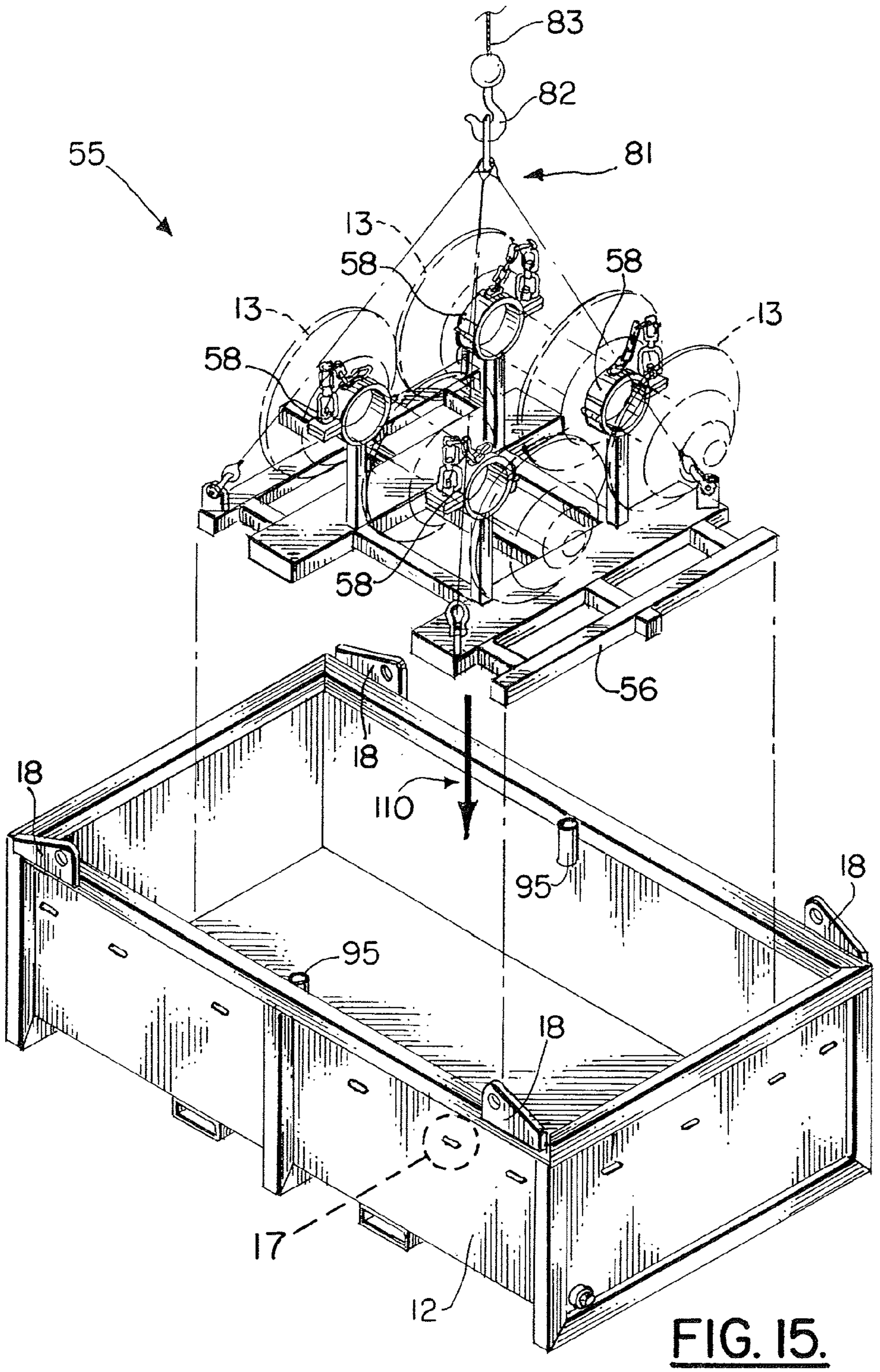
FIG. 15 is a perspective view of an alternate embodiment of the apparatus of the present invention.
Figure 17:
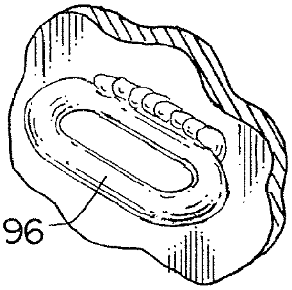
FIG. 17 is a fragmentary perspective view of an alternate embodiment of the apparatus of the present invention.

Each clamp 58 (see FIG. 13) is comprised of upper 73 and lower 72 clamp sections. Lower section 72 has a flange 74 and a curved section 75. Similarly, upper section 73 has a curved section 77 and flange 76. Curved sections 72, 73 can be connected together at hinge 71. Each of the clamps 58 can be of the same construction as clamp 30, providing a tether 78 that can include a chain, swivel, eyelet and nut. The tether 78 and connection 79 are the same as with the clamp 30 of the preferred embodiment. Each clamp 58 provides an open center 80 that is receptive of a part of pipeline pig 13 as shown in FIG. 15.

The pipeline pig rack apparatus 55 and a pair of pigs 13 can be lifted using rigging 81 and a lifting device such as a crane hook 82, crane lifting line 83, and a commercially available crane (not shown). This arrangement can be seen in FIG. 15. Pipeline pig apparatus 55 can be lowered into basket receptacle 12 as indicated schematically by arrow 110 in FIG. 15.

Figure 16:
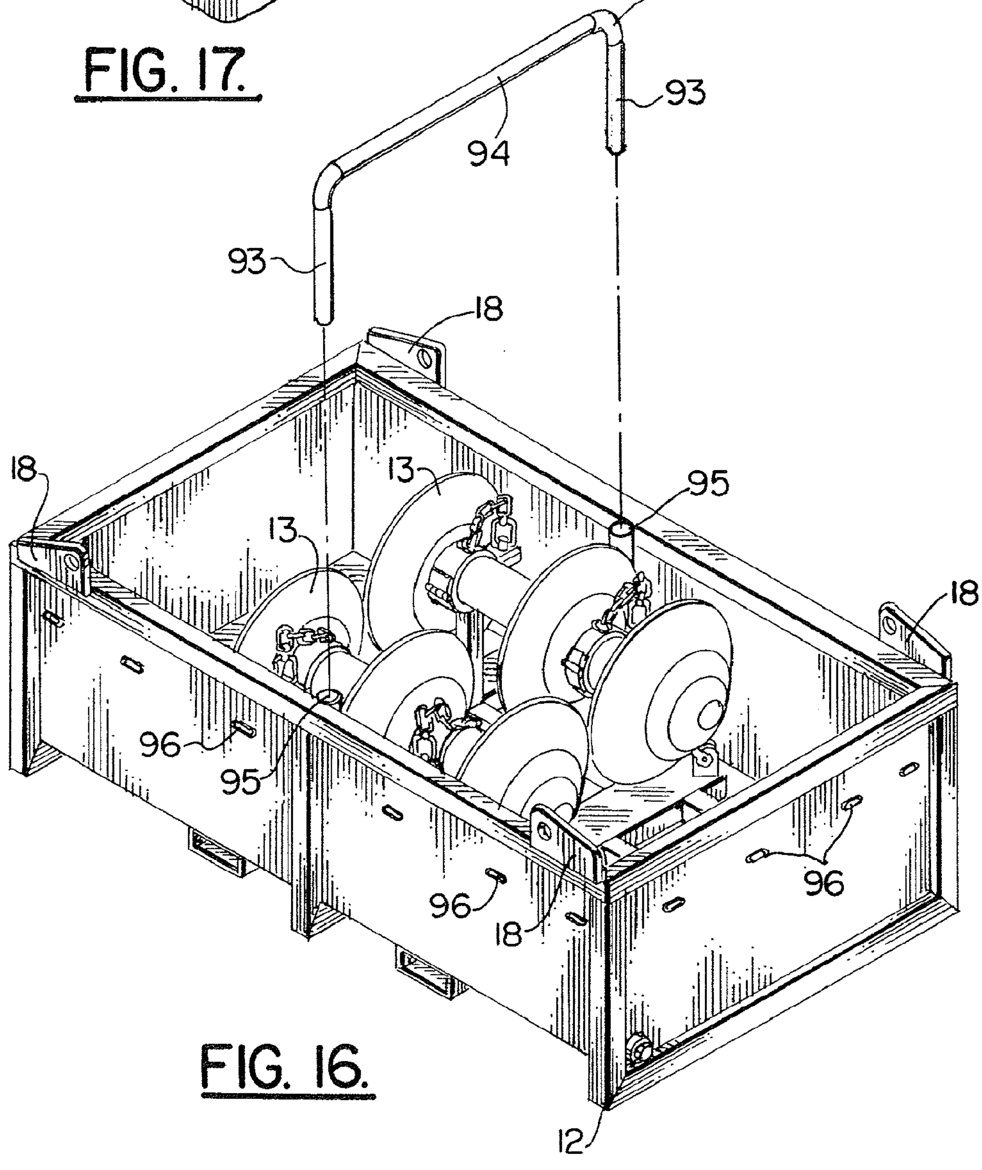
FIG. 16 is a perspective view of an alternate embodiment of the apparatus of the present invention.
Figure 18:
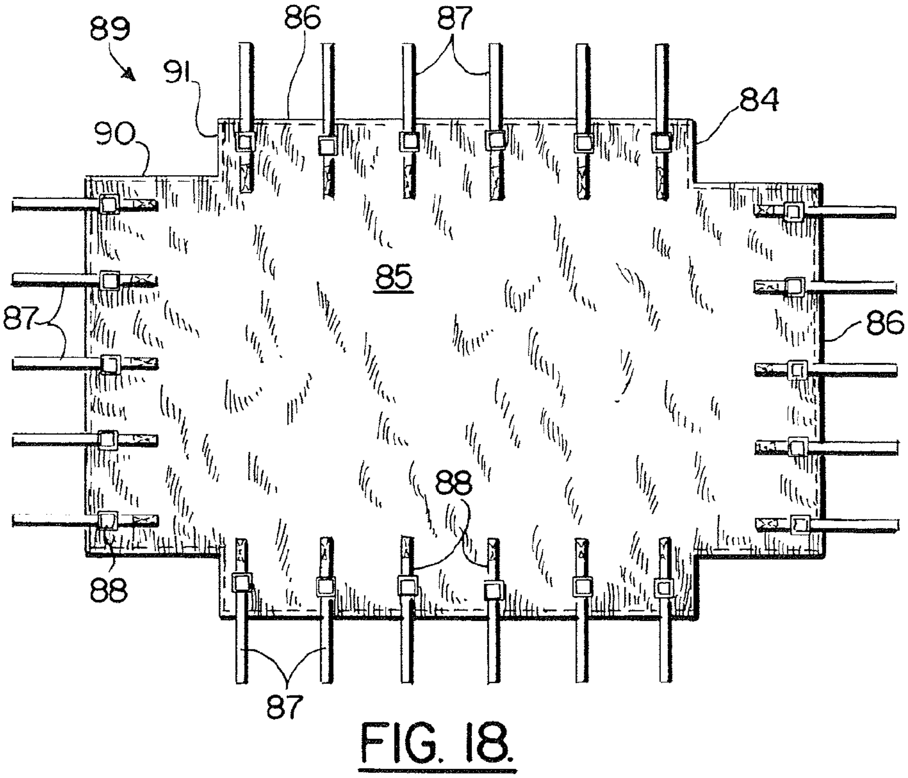
FIG. 18 is a partial plan view of an alternate embodiment of the apparatus of the present invention.
Figure 19:
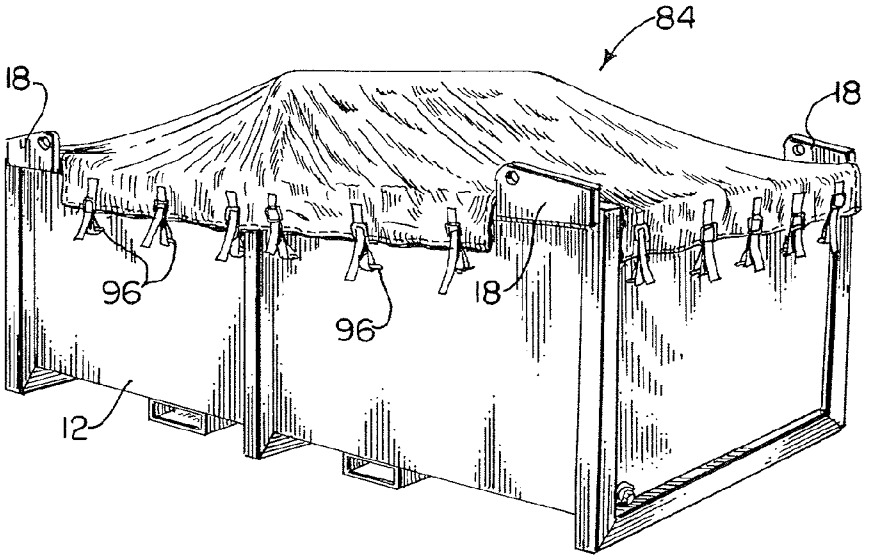
FIG. 19 is a perspective view of an alternate embodiment of the apparatus of the present invention.

FIGS. 16-19 show an arrangement for protectively covering a pipeline pig 13 that might be contained upon pipeline pig rack apparatus 55 and then housed within basket receptacle 12. Basket receptacle 12 in FIG. 16 can be of the same construction as the basket receptacle 12 shown in FIGS. 6-10. The basket receptacle 12 in FIGS. 16-19 is fitted with u-shaped member 92 having vertical sections 93 that register in receptacles 95 respectively (see FIG. 16). The u-shaped member 92 can provide a horizontal section 94 as shown in FIG. 16. There is preferably provided a stop at the bottom of each receptacle 95 for limiting the degree of penetration of each vertical section 93 into receptacle 95. In this fashion, the horizontal section 94 of u-shaped member 92 extends upwardly above the basket receptacle 12 as shown in FIG. 19 for elevating the central portion of cover 84.

Cover 84 can be constructed of a sheet of waterproof material 85 having periphery 86. The periphery 86 is provided with a plurality of straps 87, each having a closure buckle 88 for enabling the length of the strap 87 to be varied. The sidewalls of receptacle 12 are provided with a plurality of eyelets 96 (see FIGS. 16-17, 19). Each strap 87 and buckle 88 forms a connection to an eyelet 96 as shown in FIG. 19. The buckles 88 enable the straps 87 to be tightened so that the cover 84 is pulled tight, resting upon the upper edge of basket receptacle 12 and upon u-shaped member 92 as shown in FIG. 19.

Each corner 89 of cover 84 is in the nature of a cutout as defined by edges 90, 91 for each corner 89. These cutouts provided by edges 90, 91 enable cover 84 to fit around lifting eyes 18 as shown in FIG. 19.

Figure 20:
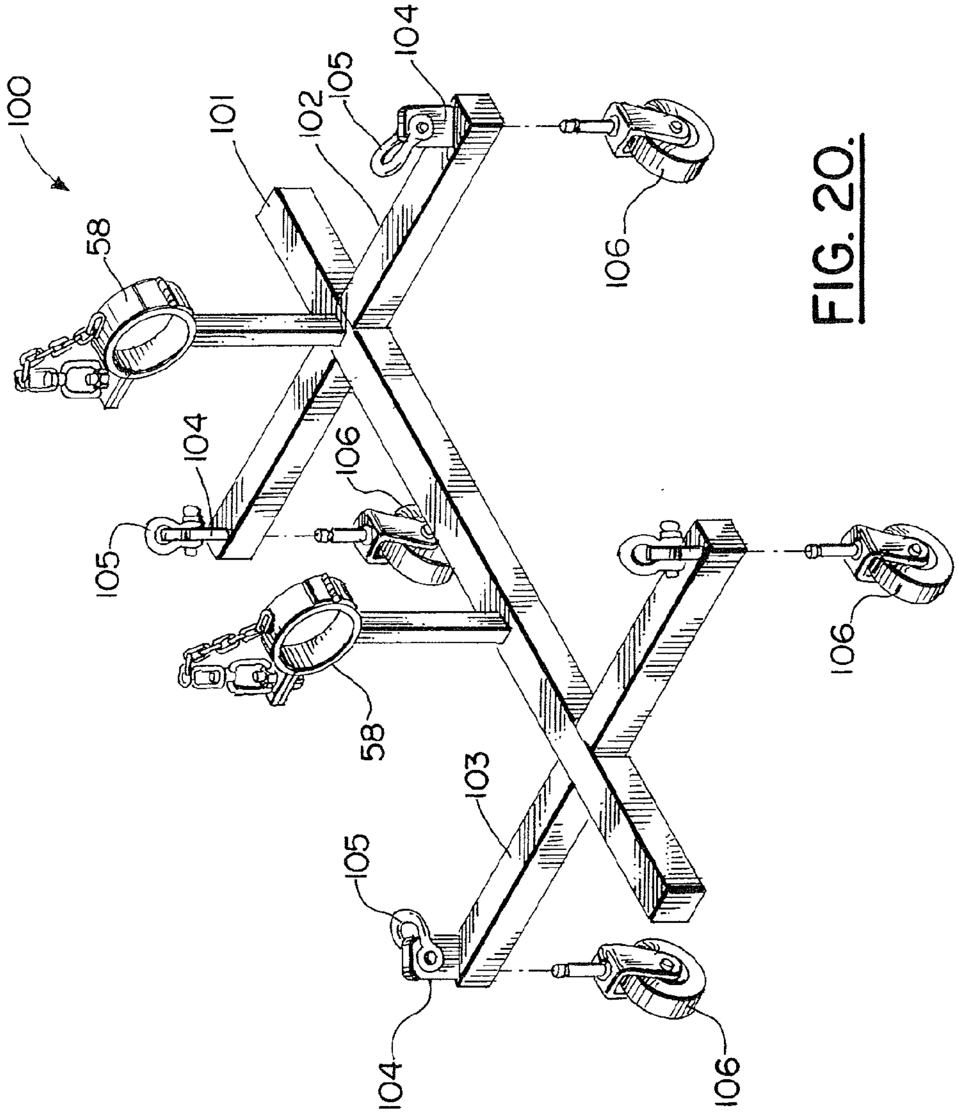
FIG. 20 is a partial perspective view of another alternate embodiment of the apparatus of the present invention.

In FIG. 20, an optional wheeled base 100 is shown. Base 100 has a longitudinal beam 101 and a pair of transverse beams 102, 103. Padeyes 104 are placed at each end of each transverse beam 102, 103. A shackle 105 can be attached to each padeye 104. Lifting lines, slings or other rigging can thus be attached to shackles 105 when base 100 is to be lifted. Casters 106 are placed under each beam 102, 103 at the ends of the beams 102, 103 (see FIG. 20).

PARTS LIST

Drawings

The following is a list of parts suitable for use in the present invention:

| Parts Number | Description |
|---|---|
| 10 | pipeline pig rack apparatus |
| 11 | frame |
| 12 | basket receptacle |
| 13 | pipeline pig |
| 14 | shaft |
| 15 | disk |
| 16 | disk |
| 17 | disk |
| 18 | lifting eye |
| 19 | shackle |
| 20 | sling |
| 21 | longitudinal beam |
| 22 | transverse beam |
| 23 | lifting eye |
| 24 | lifting eye |
| 25 | end portion |
| 26 | end portion |
| 27 | post |
| 28 | post |
| 29 | interior |
| 30 | clamp |
| 31 | u-shaped member |
| 32 | welded connection |
| 33 | u-shaped member |
| 34 | hinge |
| 35 | flange |
| 36 | flange |

-continued

| Parts Number | Description |
|---|---|
| 37 | arrow |
| 38 | chain |
| 39 | weld |
| 40 | bolt |
| 41 | nut |
| 42 | swivel |
| 43 | ring |
| 44 | bottom wall |
| 45 | side wall |
| 46 | end wall |
| 47 | arrow |
| 48 | transverse beam |
| 49 | vertical beam |
| 50 | peripheral beam |
| 51 | peripheral beam |
| 52 | drain opening |
| 53 | tubing section |
| 54 | longitudinal bottom beam |
| 55 | pipeline pig rack apparatus |
| 56 | base |
| 57 | post |
| 58 | clamp |
| 59 | longitudinal beam |
| 60 | longitudinal beam |
| 61 | longitudinal beam |
| 62 | transverse beam |
| 63 | transverse beam |
| 64 | socket |
| 65 | socket |
| 66 | longitudinal beam |
| 67 | transverse beam |
| 68 | transverse beam |
| 69 | padeye |
| 70 | opening |
| 71 | hinge |
| 72 | lower section |
| 73 | upper section |
| 74 | flange |
| 75 | curved section |
| 76 | flange |
| 77 | curved section |
| 78 | tether |
| 79 | connection |
| 80 | open center |
| 81 | rigging |
| 82 | crane hook |
| 83 | crane lifting line |
| 84 | cover |
| 85 | sheet of material |
| 86 | periphery |
| 87 | strap |
| 88 | buckle |
| 89 | corner |
| 90 | edge |
| 91 | edge |
| 92 | u-shaped member |
| 93 | vertical section |
| 94 | horizontal section |
| 95 | receptacle |
| 96 | eyelet |
| 100 | wheeled base |
| 101 | longitudinal beam |
| 102 | transverse beam |
| 103 | transverse beam |
| 104 | padeye |
| 105 | shackle |
| 106 | caster |
| 110 | arrow |
| 119 | shackle |
| 120 | sling |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A pipeline pig and rack transport apparatus, comprising:

a) a frame;

b) a plurality of pig supports mounted on the frame and extending upwardly therefrom;

c) each pig support including a post extending outwardly from the frame a first distance, a clamp on the post comprised of first and second U-shaped members that are attached with a hinge;

d) a connection opposite the hinge for holding the first and second U-shaped members together in a closed position;

e) one or more pipeline pigs, each pig secured to a pair of said posts with the clamps, each pig having a smaller diameter section that is gripped by said clamp and a larger diameter section having a diameter that extends radially away from and circumferentially around both the smaller diameter section and the U-shaped members; and f) lifting means on the frame for enabling the frame and pig supports and one or more of said pipeline pigs to be lifted as a unit; and g) a walled receptacle that contains the frame and one or more said pipeline pigs, the receptacle having an upper edge portion that extends above at least a part of one of said pigs.

2. The pipeline pig rack apparatus of claim 1 wherein the frame has a longitudinal beam and a plurality of transverse beams that are attached to the longitudinal beam at spaced apart locations.

3. The pipeline pig rack apparatus of claim 1 wherein the frame includes longitudinal and transverse members.

4. The pipeline pig rack apparatus of claim 2 wherein the pair of posts are on at least some of the transverse beams.

5. The pipeline pig rack apparatus of claim 3 wherein the pair of posts are on at least some of the transverse members.

6. A pipeline pig rack apparatus, comprising:

a) a frame that includes one or more longitudinal beams and a plurality of transverse beams connected to the one or more longitudinal beams;

b) a plurality of pig supports mounted on the frame and extending outwardly therefrom a first distance;

c) each pig support including a clamp comprised of first and second U-shaped members that are attached;

d) one or more pipeline pigs, each pig secured to a clamp, each pig having a smaller diameter section that is gripped by said clamp and a larger diameter section having a diameter that extends radially away from and circumferentially around the smaller diameter section and the U-shaped members, wherein the larger diameter section is not gripped by said clamp;

e) a connection opposite the attachment of the U-shaped members to one another for holding the U-shaped members together in a closed position; and f) a container, the frame and one or more pigs enveloped by the container.

7. The apparatus of claim 6, further wherein the container is a cargo basket for receiving the rack.

8. A pipeline pig and storage rack apparatus, comprising:

a) a frame;

b) a plurality of pig supports mounted on the frame and extending outwardly therefrom a first distance;

c) each pig support including a clamp having first and second U-shaped members that are attached to each other with a hinge;

d) a connection opposite the hinge for holding the first and second U-shaped members together in a closed position;

e) one or more pipeline pigs, each pig being secured to a pair of said supports with the clamps, each pig having a smaller diameter section that is gripped by said clamp and a pair of larger diameter sections that each extend radially away from and circumferentially around the smaller diameter section and the U-shaped members, wherein the clamps grip the smaller diameter section in between the pair of larger diameter sections;

f) lifting means on the frame for enabling the frame and pig supports and the one or more pipeline pigs to be lifted as a unit;

g) a walled receptacle having a bottom wall, side walls and a top, with a receptacle interior, said frame and each of said one or more pigs fitting within said interior.

9. The pipeline pig rack apparatus of claim 8 wherein the frame includes longitudinal and transverse members.

10. The pipeline pig rack apparatus of claim 8 wherein the frame has a longitudinal beam and a plurality of transverse beams that are attached to the longitudinal beam at spaced apart locations.

11. The pipeline pig rack apparatus of claim 9 wherein the pair of supports are on at least some of the transverse members.

12. The pipeline pig rack apparatus of claim 10 wherein the pair of supports are on at least some of the transverse beams.

13. A pipeline pig storage rack apparatus, comprising:

a) a frame that includes one or more longitudinal beams and a plurality of transverse beams connected to the one or more longitudinal beams;

b) a plurality of pig supports mounted on the frame and extending outwardly therefrom a first distance;

c) each pig support including a clamp comprised of first and second U-shaped members that are attached to one another;

d) a connection for holding the U-shaped members together in a closed position;

e) one or more pipeline pigs, each said pig secured to a clamp, each pig having a smaller diameter section having end portions and being gripped by said clamp, each pig having multiple larger diameter sections that extend radially away from the smaller diameter section and the clamps; and f) a walled receptacle having a bottom wall, side walls and a top, with a receptacle interior, said frame and one or more pigs fitting within said interior, wherein the one or more pigs are contained below the top of the receptacle.

14. The apparatus of claim 13, further wherein the receptacle is a cargo basket for receiving the rack.

15. A method of transporting pigs, comprising:

providing the apparatus of claim 1;

transporting the rack after the pig or pigs are secured to the rack.

16. A pipeline pig rack apparatus, comprising:

a) a frame that includes one or more longitudinal beams and a plurality of transverse beams connected to the one or more longitudinal beams;

b) a plurality of pig supports mounted on the frame and extending outwardly therefrom a first distance;

c) each pig support including a clamp comprised of first and second U-shaped members that are attached to one another;

d) a connection for holding the U-shaped members together in a closed position;

e) one or more pipeline pigs, each pig secured to a clamp, each pig having a smaller diameter section that is gripped by a said clamp and a larger diameter section that extends radially away from and circumferentially around the smaller diameter section and the U-shaped members;

f) a walled container that houses the frame and pigs;

g) a removable cover that is fitted to the container, wherein the container and the cover are sized and shaped to envelope the frame and pigs.

17. Apparatus including the pipeline pig rack apparatus of claim 16, further comprising forklift tine sockets on the frame.

* * * * *